(12) United States Patent
Karlsson et al.

(10) Patent No.: US 8,874,122 B2
(45) Date of Patent: Oct. 28, 2014

(54) METHOD AND APPARATUS FOR SECONDARY SHARING

(75) Inventors: Jorgen Karlsson, Sundbyberg (SE);
Tim Irnich, Neuss (DE); Jonas Kronander, Uppsala (SE); Mikael Prytz, Ronninge (SE); Muhammad Imadur Rahman, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/702,293

(22) PCT Filed: Jul. 13, 2010

(86) PCT No.: PCT/SE2010/050839
§ 371 (c)(1),
(2), (4) Date: Dec. 5, 2012

(87) PCT Pub. No.: WO2012/008888
PCT Pub. Date: Jan. 19, 2012

(65) Prior Publication Data
US 2013/0115964 A1    May 9, 2013

(51) Int. Cl.
*H04W 16/14*    (2009.01)

(52) U.S. Cl.
CPC .................... *H04W 16/14* (2013.01)
USPC .......... 455/450; 455/552.1; 370/338

(58) Field of Classification Search
CPC ........................................ H04B 1/00
USPC ......................... 455/450, 454, 509
See application file for complete search history.

(56) References Cited

U.S. PATENT DOCUMENTS

| | | | |
|---|---|---|---|
| 8,504,099 B2 * | 8/2013 | Corson et al. | 455/552.1 |
| 2004/0047324 A1 * | 3/2004 | Diener | 370/338 |
| 2006/0083205 A1 * | 4/2006 | Buddhikot et al. | 370/338 |
| 2006/0084444 A1 * | 4/2006 | Kossi et al. | 455/450 |

OTHER PUBLICATIONS

International Search Report, Application No. PCT/SE2010/050838, Mar. 17, 2011.
Written Opinion of the International Searching Authority, Application No. PCT/SE2010/050838, Mar. 17, 2011.
Chen et al., "Robust Distributed Spectrum Sensing in Cognitive Radio Networks", *INFOCOM 2008—IEEE 27th Conference on Computer Communications*, Apr. 13-18, 2008, pp. 1876-1884.

(Continued)

*Primary Examiner* — Kashif Siddiqui
(74) *Attorney, Agent, or Firm* — Myers Bigel Sibley & Sajovec, PA

(57) ABSTRACT

A node (105, 200) for a communications system (100), arranged to operate as a secondary user of part of a frequency spectrum, comprising a detection unit (210) for detecting other secondary users (110) who use all or part of said frequency spectrum and for detecting changes in such other secondary user's usage of their part of the frequency spectrum. The node (105, 200) also comprises a signaling unit (225) for signaling to detected other secondary users (110) that the node (105, 200) wishes to operate within their frequency spectrum as a secondary user, by means of transmitting interference signals according to a predefined pattern in the frequency spectrum of detected other secondary users. The node also comprises a decision unit (230) for deciding how the node (105, 200) should arrange its secondary operation in the frequency spectrum together with detected other secondary users (110).

18 Claims, 8 Drawing Sheets

(56) References Cited

OTHER PUBLICATIONS

Federal Communication Commission, "Second Report and Order and Memorandum Opinion and Order", FCC 08-260, ET Docket No. 04-186/ET Docket No. 02-380, Adopted: Nov. 4, 2008, Released: Nov. 14, 2008, 130 pp.

"A White Paper by the FP7 project End-to-End Efficiency ($E^3$)—Support for heterogeneous standards using CPC", $E^3$ White Paper, Version 0.4, Jun. 26, 2009 (Release date: Jun. 30, 2009), 22 pp.

* cited by examiner

METHOD AND APPARATUS FOR SECONDARY SHARING

CROSS REFERENCE TO RELATED APPLICATION

This application is a 35 U.S.C. §371 national stage application of PCT International Application No. PCT/SE2010/050839, filed on 13 Jul. 2010, the disclosure and content of which is incorporated by reference herein in its entirety. The above-referenced PCT International Application was published in the English language as International Publication No. WO 2012/008888 A1 on 19 Jan. 2012.

TECHNICAL FIELD

The present invention discloses an apparatus and a method for secondary sharing of a frequency spectrum.

BACKGROUND

Within the field of wireless systems, such as, for example, wireless communications systems, a so called primary user is a user who has a license from a regulator to operate within a frequency spectrum within a defined geographical area. A primary user may have some unused parts of his licensed frequency spectrum. The same regulator who grants licenses to primary users may also allow unlicensed usage of primary users' unused parts of the spectrum, or of the licensed parts of the spectrum outside of the defined geographical boundary, so called "secondary usage". Such "secondary usage" has gained increased interest due to spectrum scarcity, and is often carried out on a so called opportunistic basis, i.e. basically a "first come, first serve" principle.

An issue in secondary usage of an available frequency spectrum is how to distribute the available frequency spectrum between secondary users. This has to be done while respecting the principle that all secondary users have equal rights in the available frequency spectrum. In this context, another issue to be addressed is how a new secondary user in the system could/should inform current secondary user or users about its intention to use the frequency spectrum. Moreover, current secondary user or users of the spectrum can be of completely different system or systems, which means that there may not be any available method of communication between the systems, i.e. between the current secondary users and new users wishing to operate in the frequency spectrum on a secondary basis.

SUMMARY

As explained above, there is a need for a solution by means of which secondary systems can utilize unused parts of a frequency spectrum which is available in the frequency spectrum of a primary user in a better manner than previously, whilst also making it possible for a new secondary user to inform existing secondary users of its desire to start operating in the spectrum.

Such a solution is offered by the present invention in that it discloses a node for a wireless communications system. The node of the invention is arranged to operate as a secondary user of at least part of a frequency spectrum, and comprises a detection unit for detecting if one or more other secondary users use all or part of the frequency spectrum in question and for detecting changes in such other secondary user's usage of their part of the frequency spectrum in question.

According to the invention, the node also comprises a signaling unit arranged to signal to one or more detected other secondary users that the node wishes to operate within the frequency spectrum as a secondary user. The signaling unit is arranged to perform the signaling to one or more detected other secondary users by means of transmitting interference signals in the frequency spectrum of the one or more detected other secondary users, the interference signals being transmitted according to a predefined pattern. The node also comprises a decision unit for deciding how the node should arrange its secondary operation in the frequency spectrum together with detected other secondary users.

Thus, by means of the invention, it becomes possible for a node desiring to become a secondary user of a spectrum to detect the presence of existing secondary users in that spectrum, and to signal, in a decentralized manner, to detected existing secondary users that the node also desires to become a secondary user. In addition, the manner of signaling enables the signaling to be done between systems of different standards, and is carried out in a decentralized manner, which reduces or obviates the need for centralized administration.

In one embodiment of the node of the invention, the detection unit is arranged to detect if other secondary users use all or part of the frequency spectrum by means of comprising a scanning unit for scanning the frequency spectrum for use by other users and/or a receiver unit for receiving signals from other users which indicate that the other users use the frequency spectrum.

In one embodiment of the node of the invention, the decision unit is arranged to make the node operate according to a time and/or frequency sharing scheme with one or more detected other users.

In one embodiment of the node of the invention, the detection unit is arranged to detect a signal from a user of another secondary user indicating that the user of the other user wishes to use the same frequency spectrum as the node, and the decision unit is arranged to decide how the node should rearrange its operation in the frequency spectrum when signals indicative of this are detected by the detection unit.

In one embodiment of the node of the invention, the decision unit is arranged to choose among at least a move to another part of the frequency spectrum, time sharing with one or more users or frequency sharing with one or more users, when deciding how the node should rearrange its operation in the frequency spectrum.

In one embodiment of the node of the invention, the decision unit is arranged to interpret a coded interference signal as being the signal from another secondary user which indicates that the other secondary user wishes to use the same frequency spectrum as the node of the invention.

The invention also discloses a method for operating a node in a wireless communications system as a secondary user of at least part of a frequency spectrum in the manner of the node described above.

BRIEF DESCRIPTION OF THE DRAWINGS

The invention will be described in more detail in the following, with reference to the appended drawings, in which.

DETAILED DESCRIPTION

In the following, embodiments of a node of the invention will be described with reference to one or more nodes in wireless communications systems which use a spectrum as a secondary spectrum, i.e. there is also a primary system which "owns", i.e., possesses a license to use, the spectrum. The primary system will not be described in the following, but its existence will however be assumed to be known by the node of the invention. The existence and spectrum usage by primary users is known by the node of the invention by means of, for example, access to a database of secondary users, pre-programming by a system operator, or by means of signals from primary users such as, for example beacon signals or Cognition enabling Pilot Channels, abbreviated as CPC.

A description will also be given of embodiments of a method according to the invention, for operating a node in a wireless communications system.

Also, the invention will be described in the following using terminology from a wireless communications system of the LTE kind, Long Term Evolution. This is however merely to facilitate the reader's understanding of the invention, and should not be used to restrict the scope of protection sought for or granted to the present invention, which can be applied in a variety of wireless communications systems, such as GSM, WiMAX, CDMA 2000, TD SCDMA etc.

In addition, in the following description, more than one secondary user will be described. It should be pointed out that although the secondary users are described below as being of the same kind, the invention can also be used with secondary users of differing standards, so that, for example, one secondary user belongs to an LTE system and another secondary user belongs to a WiMAX or a GSM system. It should be pointed out that the word "user" here and throughout the text is used to indicate a device if nothing else is pointed out. Examples of devices are mobile terminals and portable computers.

Furthermore, although the invention will be described below mainly with reference to a node which is arranged to operate as a secondary user of at least part of a frequency spectrum, it should be pointed out that the invention also discloses methods of operating a node as a secondary user of at least part of a frequency spectrum in a communications system.

Figure 1:
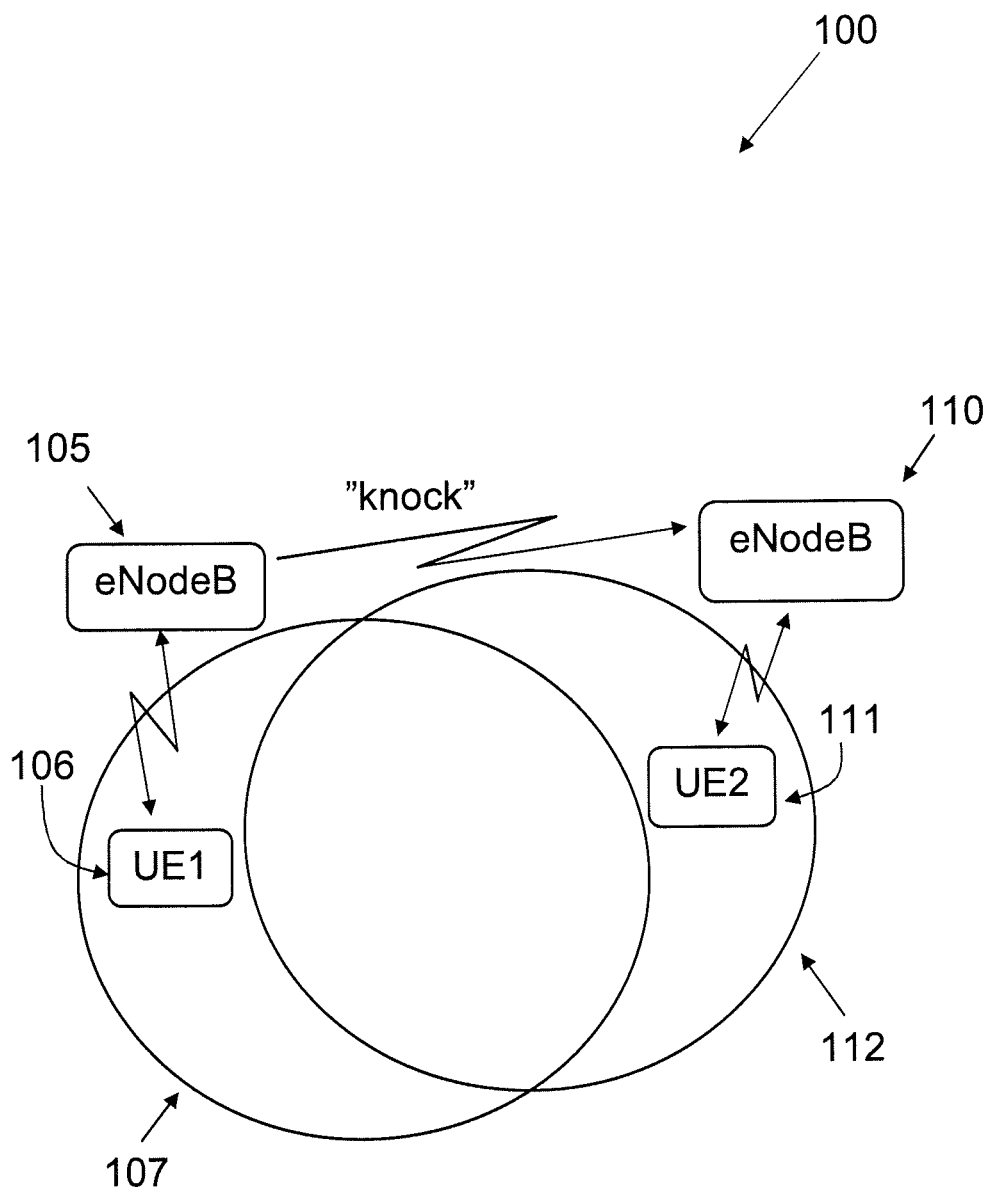
FIG. 1 shows an overview of a system in which the invention is applied.

Turning now to FIG. 1, a node 105 of an embodiment of the invention is shown in a wireless communications system 100. In the present example, the system 100 is an LTE system, and the node 105 is a controlling node, i.e. a so called eNodeB for a cell 107 of an LTE system. The cell 107 can accommodate a number of users, generically referred to as user equipment, UE, one of which is shown as 106 in FIG. 1. Naturally, the number of UEs in a cell can vary, although only one user 106 is shown in FIG. 1 for the sake of clarity.

The inventive node 105 wishes to use all or parts of a certain spectrum as a secondary user, which, as explained previously, is done on an opportunistic basis. A problem in this respect is that there may already be other secondary users which use at least parts of the desired spectrum when the node 105 wants to initiate its secondary use of the spectrum. In the example shown in FIG. 1, there is shown one other such user, i.e. one other secondary user 110, which in this case is also an eNodeB 110 of a second cell 112, which is shown as having one UE 111.

As shown in FIG. 1, the two cells 107 and 112 are not entirely co-located, which may or may not be the case.

The node 105 of this embodiment of the invention is arranged to, in a situation such as the one described above and shown in FIG. 1, detect if one or more other secondary users use all or part of the frequency spectrum available for secondary use, and the node 105 is also arranged to signal to such detected other secondary users that it wishes to initiate secondary operation in the spectrum. Such signaling will also be referred to as "knocking" from now on, and entails the inventive node 105 signaling to other users which are already in secondary operation in the frequency spectrum that the node 105 wishes to initiate operation in the part of the frequency spectrum used by those other users.

Accordingly, the node 105 detects the existing secondary user 110, and initiates a "knocking" on the user 110. The "knocking" is shown symbolically in FIG. 1 by means of an arrow labeled "knocking" from the node 105 to the node 110. It should however be made clear that this is an example only, and that it is within the scope of the invention that any node in a system "knocks" on any other node. For example, the "knocking" can occur between UEs in an ad hoc network, or an eNodeB may tell one of its UEs to knock on another UE in the system.

In addition, the node 105 is also arranged to detect changes in other secondary users' usage of their part of the frequency spectrum, and to decide how the node 105 should arrange its operation in the frequency spectrum together with detected other secondary users.

One aspect of the invention entails a node which is also receptive to such knocking, i.e. a node which, when "knocked" upon, can re-organize its operation in the frequency spectrum.

One aspect of the invention also entails a node which has both of these function, i.e. a node which is arranged to function as a secondary user of a spectrum and which can both "knock" on other secondary users as well as being receptive to "knocking" from other secondary users, and which can then take the actions which will be described in the following for a secondary user which detects a "knocking" from another node which wishes to enter the spectrum as a secondary user.

Figure 2:
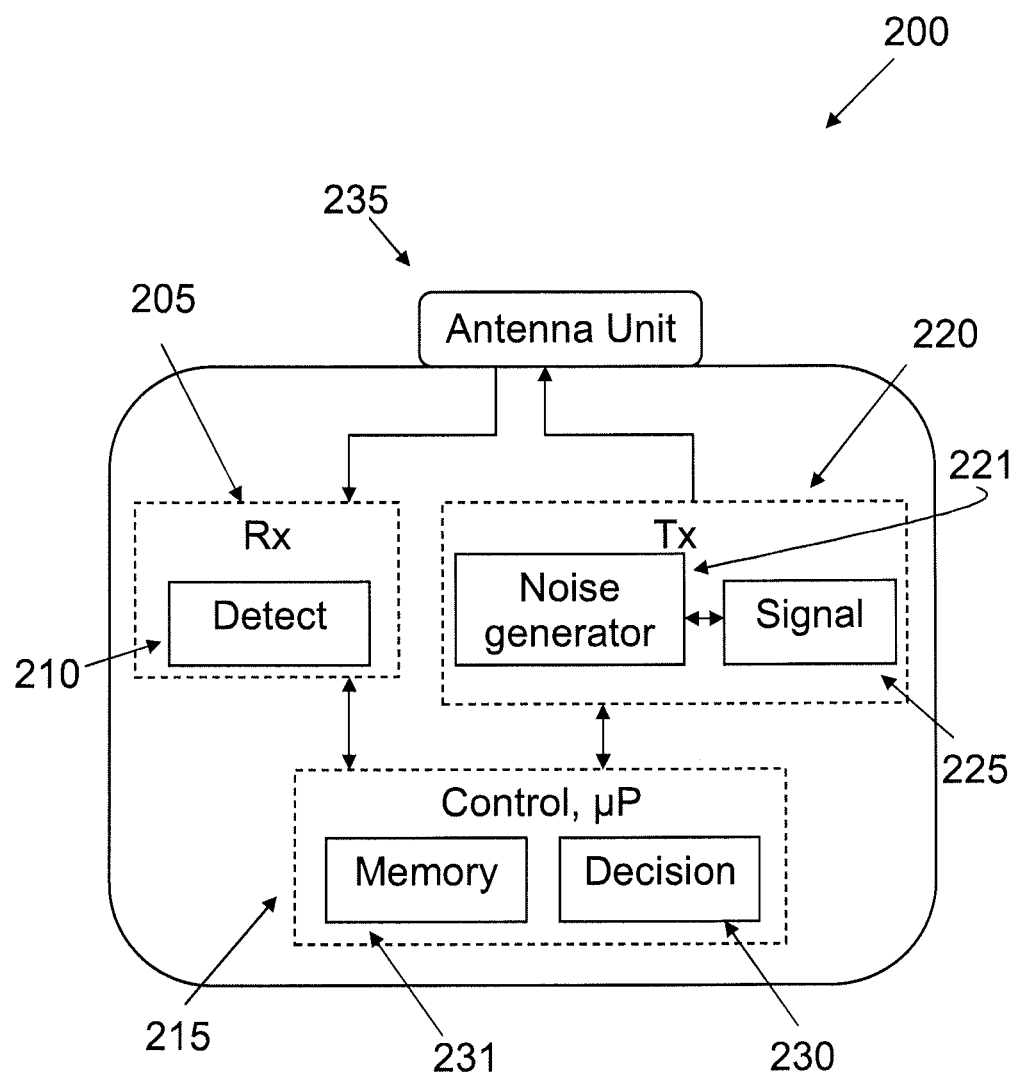
FIG. 2 shows a block diagram of a node of the invention.

FIG. 2 shows a schematic block diagram of a node 200 in a first embodiment. As shown, the node 200 suitably comprises a transmitter unit 220, a receiver unit 205 and a control unit 215. These units, i.e. the transmitter unit 220, the receiver unit 205 and the control unit 215 are used in the node's operation vis-à-vis the UEs in a cell or cells controlled by the node 200 and towards other nodes in the system as well. The control unit 215 comprises a decision unit 230 and a memory unit 231.

According to the invention, the node 200 also comprises a detection unit 210 for detecting if one or more other secondary users use all or part of a spectrum which the node 200 wishes to start using as a secondary user. The detection unit 210 is also arranged to detect changes in other secondary user's usage of their part of the frequency spectrum.

The detection unit is shown as being part of the receiver unit 205, although the receiver unit 205 is shown with dashed lines. The dashed lines indicate that the detection unit 210 can in one embodiment be part of or co-located with the receiver unit 205, although the detection unit 210 can also be a unit which is separate from the receiver unit 205.

Figure 3:
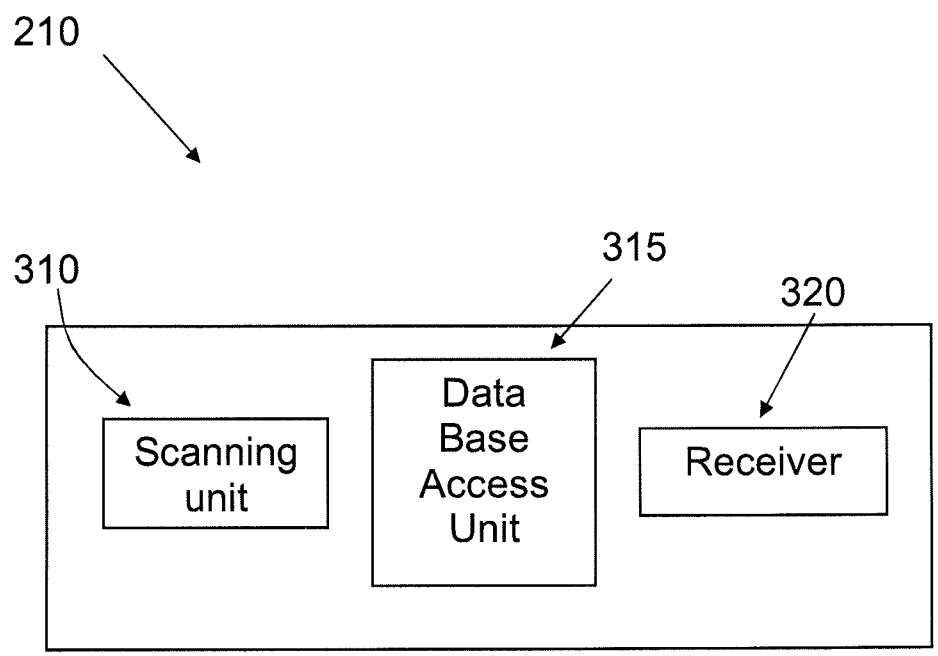
FIG. 3 shows a closer block diagram of a part of the node of FIG. 2.

Suitably, the detection unit 210 is arranged to detect secondary users of the desired spectrum by means of one or more of the following, which is also illustrated in FIG. 3 which is a schematic block diagram of a detection unit 210: a scanning unit 310 which scans the frequency spectrum for use by other secondary users and/or a receiver unit 320 for receiving signals from other secondary users which indicate that the other secondary users use the frequency spectrum. As mentioned above, the receiver unit 320 can either be the receiver unit 205 which is used by the node 200 for communication with the UEs in the cell, or it can be a separate receiver unit.

It should be pointed out that although the receiver unit 320 in FIG. 3 is shown as being part of the detection unit 210, this is merely in order to illustrate the function: the receiver unit can, as mentioned above be either the "ordinary" receiver unit of the node 200 or it can be a separate receiver unit for this purpose, i.e. "detection" purposes.

An alternative manner for the detection unit 210 to detect the presence of other secondary users in the spectrum in which the node 200 wishes to become a secondary user is to access a database of secondary users. This can be used as an alternative and/or a complement to the scanning described above.

Upon using the detection unit 210, two things can happen:
1) The detection unit 210 detects no other secondary users in those parts of the frequency spectrum which are needed by the node 200. In this case, the node 200 can initiate its operation, i.e. traffic to and from the UEs in the cell or cells controlled by the node.
2) The detection unit 210 detects that all or parts of the frequency spectrum desired for use by the node 200 is/are used by other secondary users.

Returning now to case 2 above, i.e. the case in which the detection unit has detected one or more other secondary users of those parts of the frequency spectrum which the node 200 wishes to use, the following will happen: in order to handle this case, the inventive node 200 also comprises a signaling unit 225 which is arranged to signal to one or more detected other secondary users that the node also wishes to operate within the frequency spectrum, i.e. the signaling unit is arranged to perform the procedure referred to previously as "knocking". In FIG. 2, the signaling unit 225 is shown as being part of the transmitter unit 220 of the node 200, although the transmitter unit is shown with dashed lines, for the same reason as the receiver unit 205: the signaling unit can either be comprised in the receiver unit or it can be a separate unit.

The signaling unit 225 is arranged to signal to one or more detected other secondary users by means of transmitting interference signals according to a predefined pattern in the frequency spectrum of the one or more detected other secondary users.

The term "interference signal transmitted according to a predefined pattern" is here used to denote a uniform noise signal over the frequency spectrum of the one or more detected other secondary users, which is varied over time with a predefined pattern, so that the one or more detected other secondary users will be able to detect a variation over time in their signal quality according to a pattern which is predefined as being a pattern indicating a signaling from another secondary user who wishes to use.

Since the pattern is predefined, the detected node or nodes will be able to recognize it as coming from a user who wishes to "enter" the frequency spectrum as a secondary user, in this case the node 200.

As mentioned previously, the term "transmitting interference signals transmitted according to a predefined pattern" is here used to denote the transmission of a uniform noise signal over the frequency spectrum of the one or more detected other secondary users, varied over time with a predefined pattern, so that the one or more detected other secondary users will be able to detect a variation over time in their signal quality according to a pattern which is predefined as being a pattern indicating a signaling from another secondary user. The uniform noise signal is either created in the signaling unit 225, which, in such an embodiment, comprises an internal noise generator, or, as shown, in FIG. 2, the transmit unit 220 can comprise a separate noise generator 221, connected to the signaling unit 225 and controlled by the signaling unit 225 and/or the control unit 215.

In one embodiment, the node 200 is also arranged to detect "knockings" from other secondary users. In such an embodiment, variations in the received signal quality are detected by the detection unit 210, which, in such an embodiment, is arranged to monitor the quality of the signal which is received by the receiver unit 205, and to compare variations in signal quality over time with one or more patterns which are stored in the memory unit 231.

If a variation in signal quality over time matches a stored (i.e. predefined) pattern, this is interpreted by the detection unit 210 as being a "knocking" from another user which wishes to use all or part of the same frequency spectrum as the node 200.

The detection unit signals this to the decision unit 230, which is arranged to decide how the node should rearrange its operation in the frequency spectrum when signals indicative of this are detected by the detection unit 210.

Figure 4:
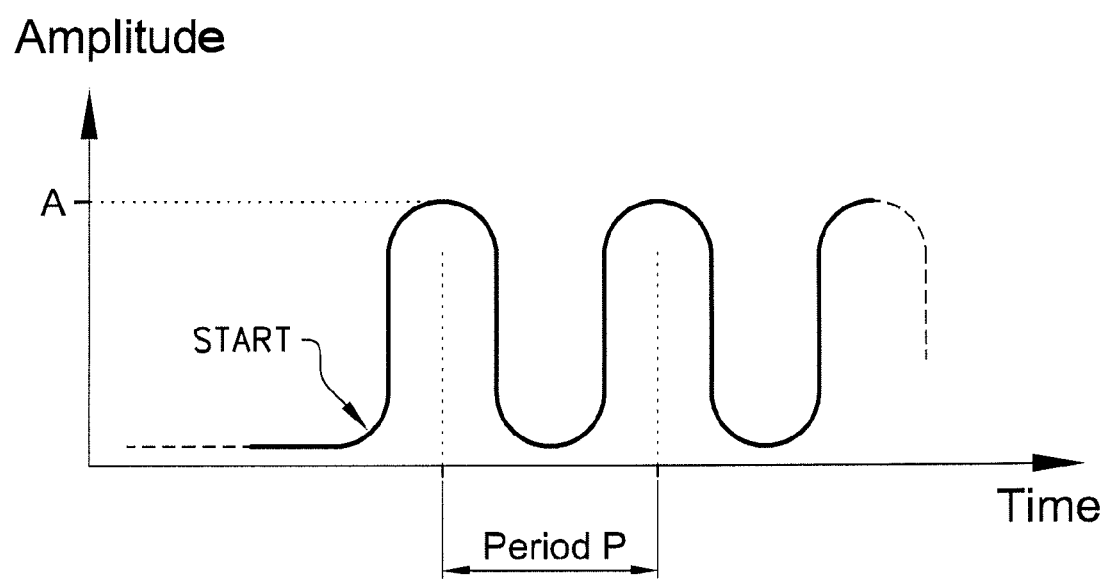
FIG. 4 illustrates a principle of the invention.

FIG. 4 shows one example of "knocking" messages transmitted as interference signals with a predefined pattern: in this example, the knocking messages are pulses of noise, and the predefined pattern comprises transmitting them with a certain regularity or period P, as well as with a defined amplitude A, where one or both of the period P and the amplitude A constitute the coding. The knocking messages are transmitted in order to trigger the interfered user, i.e. the user which is "knocked upon", to reorganize its use of the frequency spectrum to accommodate the needs of the "knocking" user.

A user which is "knocked" upon can react in a number of ways to the knocking, each of which will be detected by the "knocking" user:
  a. The user which is knocked upon detects another part of the secondary frequency spectrum which is large enough for its needs, and transfers its operation to that part of the secondary frequency spectrum.
  b. The user which is knocked upon detects no other part of the secondary frequency spectrum which is large enough for its needs, but initiates a shared operation in its part of the secondary frequency spectrum. The sharing can be either time sharing or frequency sharing or a combination of the two.

According to an embodiment of the invention, either of the reactions a or b above will be detected by the detection unit 210 of the inventive node 200, and will cause a corresponding action in the inventive node, which will be described below with reference to the appended FIGS. 5-8. Naturally, although the detection unit 210 is described here as being arranged to detect both secondary users and changes in such other secondary user's usage of their part of the frequency spectrum, as well as knockings from other nodes, these tasks can also in a node of the invention be divided into two or more different units, e.g. a first detection unit for detecting other secondary users and changes in such other secondary user's usage of their part of the frequency spectrum, and a second detection unit for detecting knockings on the own node from other secondary users.

Figure 5:
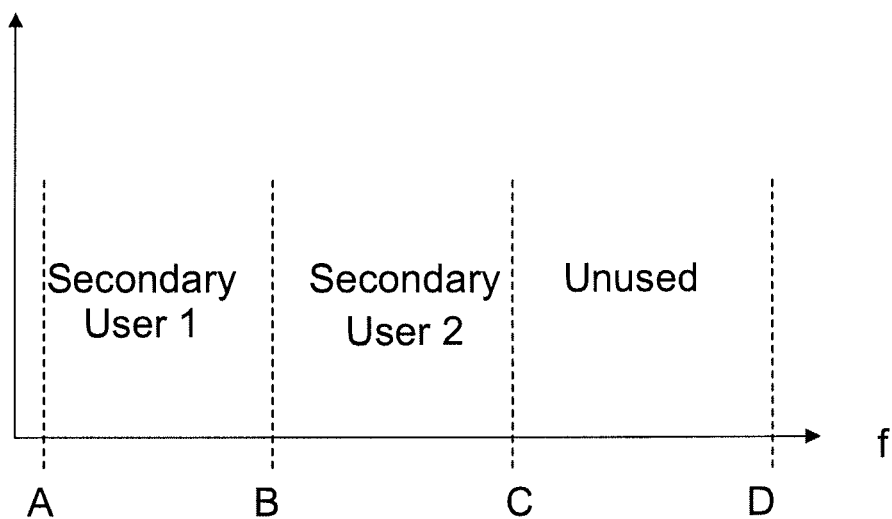
FIGS. 5-7 illustrate event sequences in a system which uses the invention.
Figure 6:
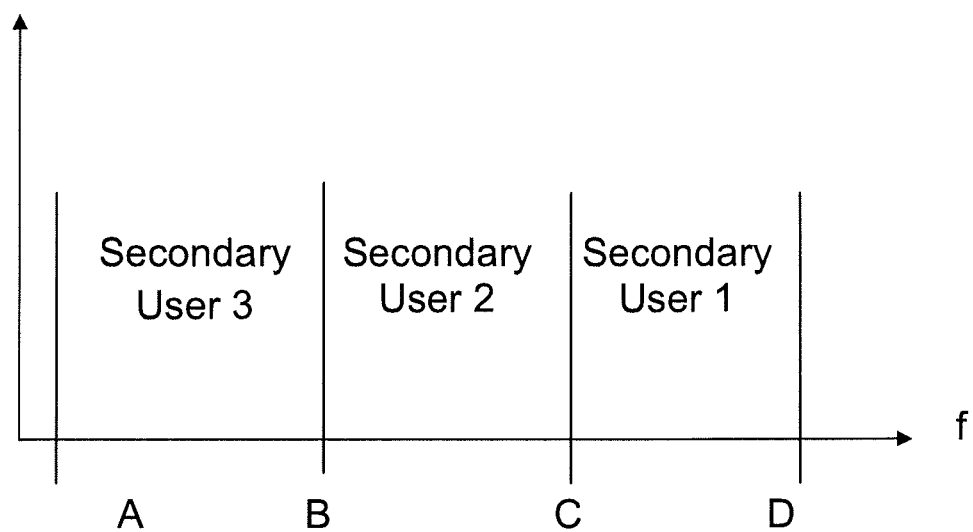
Figure 7:
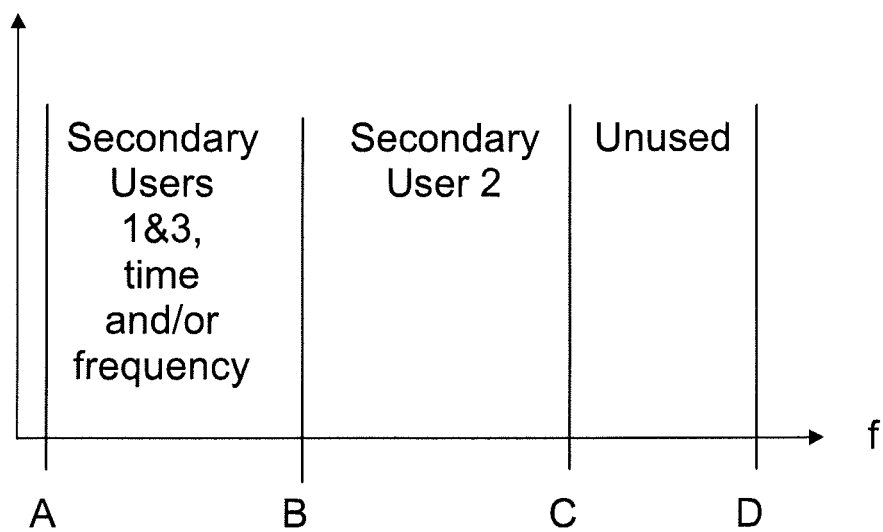

FIG. 5 shows a frequency spectrum which spans from frequency A to frequency D, with three "sub-spectrums", A-B, B-C and C-D. There are shown two secondary users, referred to as "Secondary User 1" and "Secondary User 2", for short SU 1 and SU2, where SU1 uses the sub-spectrum A-B, and SU 2 uses sub-spectrum B-C, while sub-spectrum C-D is unused. A third secondary user, SU 3, which is a node of the invention, now wishes to initiate operation in the frequency spectrum A-D, and by means of its detection unit identifies SU 1 and SU 2, and their positions in the frequency spectrum. SU 3 also detects the unused sub-spectrum C-D, which however is too small for the needs of SU 3. Accordingly, the decision unit of the inventive node identifies sub-spectrum A-B as a suitable "spectrum chunk" to operate in, and causes the signaling unit to "knock" on SU 1, as describe above in connection to FIGS. 2 and 3. The "knocking" can be restricted to SU 1 and not include SU 2 by means of only transmitting the coded interference signals in the sub-spectrum used by SU 1, i.e. A-B. Various cases, as described in a-c above can now occur, which will be described with reference to an embodiment of the node of the invention as SU 3:

Case a: In the scenario shown in FIG. 6, SU 3 has knocked on SU 1, and SU 1 has then detected another part of the frequency spectrum, in this case sub-spectrum C-D, which is sufficient for the operation of SU1, and has transferred its operation to that sub-spectrum. The detection unit of SU3 detects that sub-spectrum A-B is now empty of users, and SU3 initiates operation there. SU2 has not been affected, and has not detected the "knocking" form User 3 on User 1, since the coded interference signals are transmitted exclusively in sub-spectrum A-B.

Case b: In the scenario shown in FIG. 7, SU3 has knocked on SU 1, and SU1 has decided that it cannot move its operation spectrum-wise, so SU 1 decides to share sub-spectrum A-B with the knocking secondary user, i.e. SU3. The sharing can be done either as frequency sharing or time-sharing or as a combination of those two, i.e. both time and frequency sharing. Depending on the kind of sharing, frequency or time, SU 1 partitions the available time and/or frequency into slots, and starts to use a portion of those slots for its own use.

In the case of time sharing, SU1 "partitions" the available time into time slots, and starts to use a portion of these time slots for its own operation. As an example, SU1 partitions the available time into slots of equal length and starts to use one out of every two of those slots for its own operation, so that every other time slot is left empty. This change in operation fulfills a condition which must be fulfilled regardless of the kind of division that is chosen, namely that the division is performed in a clearly predictable manner, in order to enable the "knocking user", in this case SU 3, to detect the pattern.

In the example of time sharing, the detection unit of the "knocking secondary user", i.e. SU3, detects that sub-spectrum A-B is now available on an "every other slot basis", and starts to operate in those time slots not used by SU1. In the time sharing scenario, a so called "guard period" can also be used around the time slots used by the alternating users, so that interference is obviated.

Suitably, there are some parameters that should be specified in a standard or by, for example, a frequency regulator, in order to ensure that the invention will function smoothly. For example, the "code" and/or protocol used for information transfer via interference needs to be predefined to ensure that the meaning of the interference caused by one user to another is clear. The intervals (periodicity/frequency) and amplitude which will decide the nature of such coded interference (i.e. the "knocking") also need to be decided.

Another parameter which should suitably be predefined is the action or actions which a user should undertake when being "knocked" upon by another user.

Figure 8:
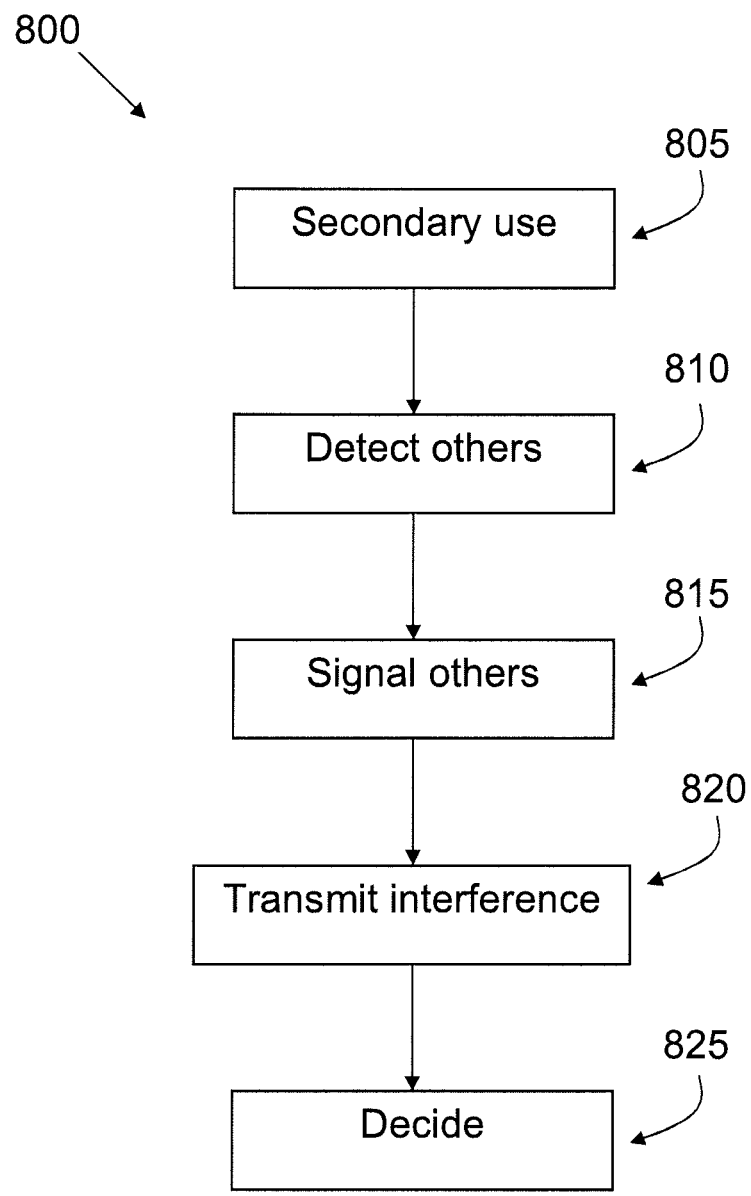
FIG. 8 shows a flow chart of a method of the invention.

FIG. 8 shows a flow chart of a method 800 of the invention. The method 800 is intended for use in a node in a wireless communications system, and comprises, as shown in step 805, using the node as a secondary user of at least part of a frequency spectrum, and detecting, step 810, if one or more other secondary users use all or part of said frequency spectrum, and detecting changes in such other secondary user's usage of their part of the frequency spectrum, The method 800 comprises signaling, step 815, to one or more detected other secondary users that the node wishes to operate within the frequency spectrum, by means of transmitting interference signals with a predefined pattern in the frequency spectrum, and deciding, step 825, how the node should arrange its operation in said frequency spectrum together with detected other secondary users.

In one embodiment of the method 800, the detection of other secondary users who use all or part of the frequency spectrum comprises scanning the frequency spectrum for use by other users, and/or receiving signals from other users which indicate that the other users use the frequency spectrum.

In one embodiment of the method 800, the node is made to operate according to a time and/or frequency sharing scheme with one or more detected other users.

In one embodiment of the method 800, the method comprises detecting a signal from another secondary user indicating that the other secondary user wishes to use all or part of the same frequency spectrum as the node, and deciding how the node should rearrange its operation in the frequency spectrum when signals indicative of this are detected.

In one such embodiment, at least one of the following is chosen when deciding how the node should rearrange its operation in the frequency spectrum: a move to another part of the frequency spectrum, time sharing with one or more users, and/or frequency sharing with one or more users.

The invention is not limited to the examples of embodiments described above and shown in the drawings, but may be freely varied within the scope of the appended claims.

The invention claimed is:

1. A node for a wireless communications system, the node being arranged to operate as a secondary user of at least part of a frequency spectrum, the node comprising:
    a detection unit configured to detect if one or more other secondary users use all or part of the frequency spectrum and to detect changes in such other secondary user's usage of their part of the frequency spectrum;
    a signaling unit configured to signal to one or more detected other secondary users that the node wants to operate within the frequency spectrum as a secondary user, wherein the signaling unit performs the signalling by transmitting interference signals according to a predefined pattern in the frequency spectrum of the one or more detected other secondary users; and
    a decision unit configured to determine how the node should arrange its secondary operation in the frequency spectrum together with detected other secondary users.

2. The node of claim 1, wherein:
    the detection unit comprises a scanning unit for scanning the frequency spectrum for use by other secondary users and/or a receiver unit for receiving signals from other users which indicate that the other users use the frequency spectrum.

3. The node of claim 1, wherein the decision unit is configured to make the node operate according to a time and/or frequency sharing scheme with one or more detected other users.

4. The node of claim 1, wherein:
   the detection unit is configured to detect a signal from another secondary user indicating that the other secondary user wants to use all or part of the same frequency spectrum as the node, and
   the decision unit is configured to decide how the node should rearrange its operation in the frequency spectrum in response to signals detected by the detection unit that are indicative of the one or more other secondary users use of all or part of the frequency spectrum.

5. The node of claim 4, wherein, when deciding how the node should rearrange its operation in the frequency spectrum, the decision unit is configured to perform operations to at least one of: move to another part of the frequency spectrum, time share the frequency spectrum with one or more users, and/or to frequency share the frequency spectrum with one or more users.

6. A method for operating a node in a wireless communications system, the method comprising:
   operating the node as a secondary user of at least part of a frequency spectrum,
   detecting if one or more other secondary users use all or part of the frequency spectrum,
   detecting changes in such other secondary user's usage of their part of the frequency spectrum,
   signaling to one or more detected other secondary users that the node wants to operate within the frequency spectrum as a secondary user by transmitting interference signals according to a predefined pattern in the frequency spectrum of the one or more detected other secondary users, and
   deciding how the node should arrange its operation in the frequency spectrum together with detected other secondary users.

7. The method of claim 6, wherein detecting if one or more other secondary users use all or part of the frequency spectrum comprises scanning the frequency spectrum for use by other users and/or receiving signals from other secondary users which indicate that the other secondary users use the frequency spectrum.

8. The method of claim 6, further comprising operating the node to time share the frequency spectrum with one or more detected other secondary users and/or to frequency share the frequency spectrum with one or more detected other secondary users.

9. The method claim 6, further comprising:
   detecting a signal from another secondary user indicating that the other secondary user wants to use all or part of the same frequency spectrum as the node, and
   deciding how the node should rearrange its operation in the frequency spectrum when signals indicative of this are detected.

10. The method of claim 9, wherein deciding how the nod should rearrange its operation in the frequency spectrum comprises performing operations to at least one of: move to another part of the frequency spectrum, time share the frequency spectrum with one or more users, and/or frequency share the frequency spectrum with one or more users.

11. The method of claim 6,
    wherein the node comprises a first base station, and
    wherein signaling to the one or more detected other secondary users comprises:
      signaling, to a second base station that is operating as a secondary user, that the first base station wants to operate within the frequency spectrum as a secondary user.

12. The method of claim 6, wherein transmitting the interference signals comprises:
    transmitting the interference signals after detecting if the one or more other secondary users use all or part of the frequency spectrum.

13. The method of claim 6,
    wherein the interference signals comprise pulses of noise, and
    wherein transmitting the interference signals comprises:
      transmitting the pulses of noise according to the predefined pattern.

14. The method of claim 6, wherein transmitting the interference signals comprises:
    restricting the interference signals to a particular one of the one or more detected other secondary users, by transmitting the interference signals to only the particular one of the one or more detected other secondary users via a sub-spectrum, of the frequency spectrum, that is used by the particular one of the one or more detected other secondary users.

15. The node of claim 1,
    wherein the node comprises a first base station, and
    wherein the signaling unit is configured to signal, to a second base station that is operating as a secondary user, that the first base station wants to operate within the frequency spectrum as a secondary user.

16. The node of claim 1, wherein the signaling unit is configured to perform the signaling by transmitting the interference signals after the detection unit detects if the one or more other secondary users use all or part of the frequency spectrum.

17. The node of claim 1,
    wherein the interference signals comprise pulses of noise, and
    wherein the signaling unit is configured to perform the signaling by transmitting the pulses of noise according to the predefined pattern.

18. The node of claim 1, wherein the signaling unit is configured to perform the signaling by restricting the interference signals to a particular one of the one or more detected other secondary users, by transmitting the interference signals to only the particular one of the one or more detected other secondary users via a sub-spectrum, of the frequency spectrum, that is used by the particular one of the one or more detected other secondary users.

* * * * *

UNITED STATES PATENT AND TRADEMARK OFFICE
CERTIFICATE OF CORRECTION

PATENT NO. : 8,874,122 B2  Page 1 of 1
APPLICATION NO. : 13/702293
DATED : October 28, 2014
INVENTOR(S) : Karlsson et al.

It is certified that error appears in the above-identified patent and that said Letters Patent is hereby corrected as shown below:

On the Title Page, Item (75), under "Inventors", in Column 1, Line 1, delete "Jorgen" and insert -- Jörgen --, therefor.

On the Title Page, Item (75), under "Inventors", in Column 1, Line 4, delete "Ronninge" and insert -- Rönninge --, therefor.

In the Specification

In Column 2, Line 60, delete "which" and insert -- which: --, therefor.

In Column 8, Line 8, delete "spectrum," and insert -- spectrum. --, therefor.

In the Claims

In Column 9, Line 46, in Claim 9, delete "method" and insert -- method of --, therefor.

In Column 9, Line 53, in Claim 10, delete "nod" and insert -- node --, therefor.

Signed and Sealed this
Ninth Day of June, 2015

Michelle K. Lee
*Director of the United States Patent and Trademark Office*